(12) United States Patent
Wood

(10) Patent No.: US 7,516,904 B2
(45) Date of Patent: Apr. 14, 2009

(54) METHODS FOR ENCODING AND DECODING INFORMATION

(75) Inventor: David E. Wood, Minnetonka, MN (US)

(73) Assignee: Veritec, Inc., Golden Valley, MN (US)

( * ) Notice: Subject to any disclaimer, the term of this patent is extended or adjusted under 35 U.S.C. 154(b) by 314 days.

(21) Appl. No.: 11/121,762

(22) Filed: May 3, 2005

(65) Prior Publication Data

US 2005/0269417 A1    Dec. 8, 2005

Related U.S. Application Data

(60) Provisional application No. 60/567,761, filed on May 3, 2004.

(51) Int. Cl.
    *G06K 19/05* (2006.01)
(52) U.S. Cl. .................... 235/494; 235/462.1
(58) Field of Classification Search ............. 235/494, 235/380, 462.1, 456, 460, 462.01; 714/758; 380/269
See application file for complete search history.

(56) References Cited

U.S. PATENT DOCUMENTS

| | | | |
|---|---|---|---|
| 4,896,029 A | 1/1990 | Chandler et al. | |
| 4,924,078 A | 5/1990 | Sant'Anselmo et al. | |
| 4,972,475 A | 11/1990 | Sant'Anselmo | |
| 5,331,176 A | 7/1994 | Sant'Anselmo et al. | |
| 5,612,524 A | 3/1997 | Sant'Anselmo et al. | |
| 5,764,774 A * | 6/1998 | Liu | 380/269 |
| 6,126,074 A | 10/2000 | He et al. | |
| 6,560,741 B1 * | 5/2003 | Gerety et al. | 714/752 |
| 6,601,772 B1 | 8/2003 | Rubin et al. | |
| 6,651,893 B2 | 11/2003 | He et al. | |
| 2003/0146283 A1 * | 8/2003 | Longacre et al. | 235/454 |
| 2004/0217159 A1 * | 11/2004 | Belanger et al. | 235/375 |

* cited by examiner

*Primary Examiner*—Daniel St. Cyr
(74) *Attorney, Agent, or Firm*—Kagan Binder, PLLC

(57) ABSTRACT

Methods for securing data by using a data encoding technique of a symbology, such as a one or two-dimensional symbology, to provide secure data without the need to convert the data into a graphical symbol are provided.

18 Claims, 2 Drawing Sheets ized code symbology techniques such as those used for Vericode™, Data Matrix™, Code One™, or any other code symbology. Such encoding would convert the information into a form that is encrypted or otherwise encoded to provide security for the data.

METHODS FOR ENCODING AND DECODING INFORMATION

This application claims the benefit of U.S. Provisional Application Ser. No. 60/567,761, filed May 3, 2004, entitled "METHODS FOR ENCODING AND DECODING INFORMATION," which application is incorporated herein by reference in its entirety for all purposes.

TECHNICAL FIELD

The present invention relates to methods for encoding and decoding information. In particular, the present invention relates to two-dimensional matrix coding technology.

BACKGROUND

Techniques for securing data, such as personal data or biometric data, are well known. For example, two-dimensional matrix coding technology uses so-called two-dimensional bar code symbologies. A two-dimensional symbology typically includes a matrix that occupies a uniform amount of space having a generally rectangular or square shape. Instead of bars and spaces, as used in 1-dimensional bar codes, round or square marks disposed at particular rows and columns of the matrix correspond to the information being conveyed. As a result, a two-dimensional matrix symbology can include significantly more data within a given volume of space than a conventional one-dimensional bar code.

Area symbologies, such as those commercially known under the tradenames Vericode™ or Data Matrix™ or Code One™ are well known two-dimensional bar code symbologies. Typically, in these techniques, information is encoded by an appropriate technique such as by encoding the information into Reed-Solomon blocks. A data matrix that contains a plurality of data cells is then generated from the encoded information. Next, the data matrix is converted to a bitmap image, in the form of a symbol, and the image is printed on an object, label, box, etc. For example, symbols of this type are now in common usage in various applications, such as inventory control, point of sale identification, or logistical tracking systems.

When data is secured by using such symbologies, the information contained within the symbol can only be obtained by using an optical imaging system to decipher the symbol. That is, some image processing technique is needed. Generally, an image of the symbol is first obtained with an imaging system. Next, the symbol is graphically processed to identify a data matrix of the symbol and the data matrix is electronically analyzed to decode the message. This can include decoding the Reed-Solomon blocks of the data matrix, for example. As such, the data contained within the symbol can be read and used. Because the optical devices and the associated decoding algorithms that are used to decode such symbols can be controlled in a secure manner, an added layer of security can be provided for such symbology techniques. However, because these symbology techniques rely on a physical symbol to encode data, these techniques are limited to applications where a physical symbol can be provided and optically accessed for reading.

SUMMARY OF THE INVENTION

The present invention provides methods for securing data by using a data encoding technique of a symbology, such as a one or two-dimensional symbology, to provide secure data without the need to convert the data into a graphical symbol. In particular, the encoding advantages of such symbol-based techniques can be used without having to print the symbols and subsequently optically process the symbols in order to obtain the data in such symbols. That is, the symbols from such two-dimensional symbologies can be processed electronically rather than graphically or optically. In this way, security features of any known or developed symbology having an encoding/decoding algorithm can be utilized without the need for a physical symbol.

In accordance with the present invention, information can be provided as an encoded digital matrix that is secure and that can be electronically stored. For example, an encoded digital matrix can be stored in a memory device such as a hard drive or a portable storage device such as a smart card or the like. As such, the information can be easily transportable and in a secure form. Accordingly, information such as personal information, financial information, and/or biometric information can be securely provided in a transportable manner.

In one aspect of the present invention, a method of encoding information is provided. The method comprises the steps of providing information to be encoded, encoding the information, generating a two-dimensional matrix from the encoded information, and storing the two-dimensional matrix of encoded information. The information to be encoded can be alphanumeric, graphical, and/or biometric information, for example. The two-dimensional matrix can comprise a digital matrix of data cells such as in a two-dimensional VeriCode™ matrix. The two-dimensional matrix can be stored in a memory storage device such as a smart card or the like.

In another aspect of the present invention, a method of encoding information in a two-dimensional VeriCode™ matrix is provided. The method comprises the steps of providing information to be encoded, encoding the information, generating a two-dimensional VeriCode™ matrix from the encoded information, and storing the two-dimensional VeriCode™ matrix of encoded information in a smart card.

In yet another aspect of the present invention, a smart card comprising encoded information is provided. The encoded information comprises a two-dimensional VeriCode™ matrix.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

Figure 1:
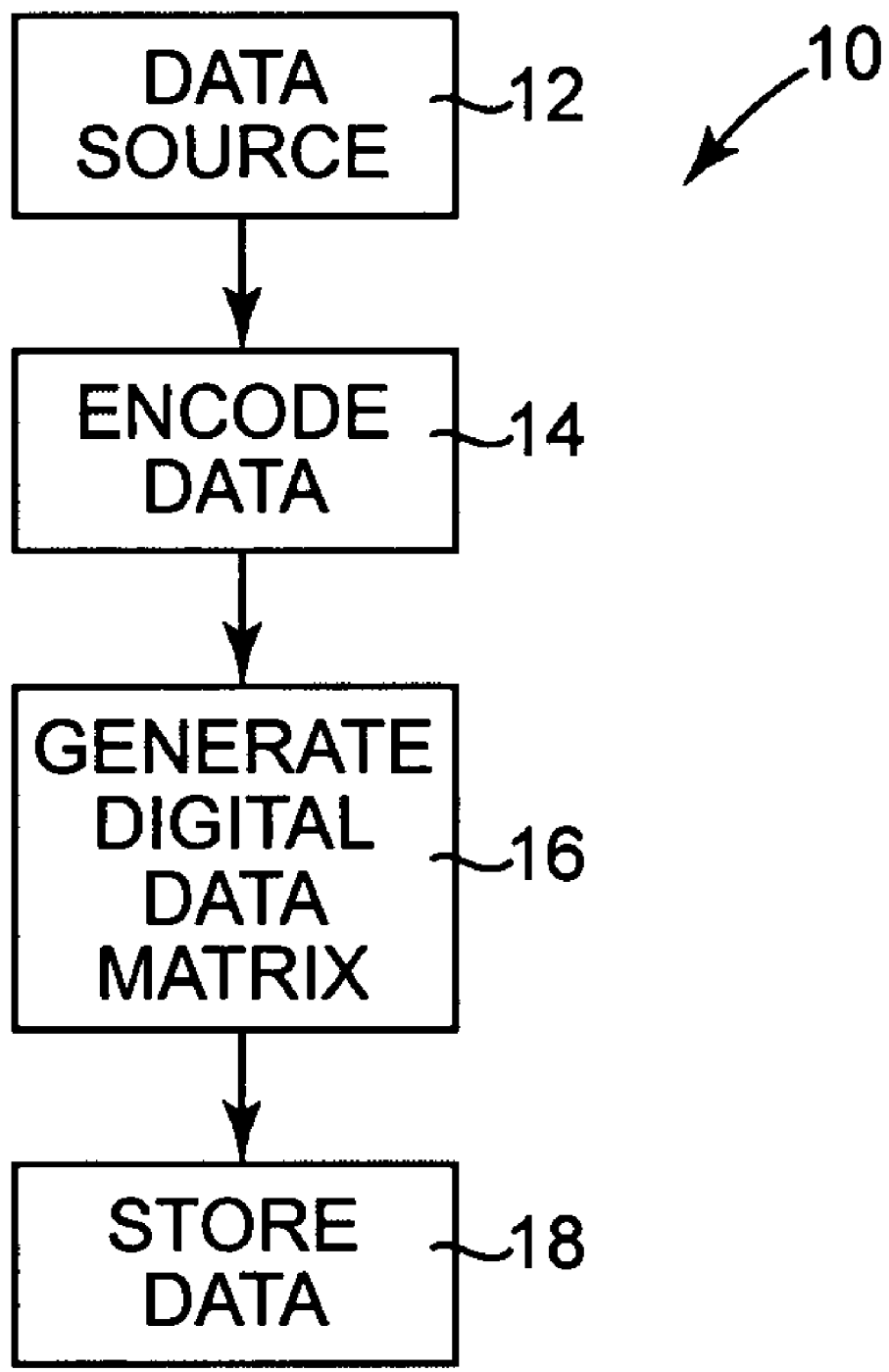
FIG. 1 is flowchart of a process for encoding information in accordance with the present invention.

Referring to FIG. 1, an exemplary process 10 of the present invention for encoding and storing data is shown. Generally, the process 10 preferably includes steps of obtaining data from a data source 12, encoding the data 14, generating a digital data matrix 16, and storing the data 18. However, additional steps are contemplated such as data processing steps for manipulating, converting, editing, or otherwise acting on or processing the data in any desired way.

An initial step of the process 10 preferably comprises obtaining data from a data source 12. The data may comprise any data that is desired to be provided in a secure and encrypted form. Such data may comprise personal data, business data, biometric data, and/or financial data for example. The present invention is particularly applicable to data that is desired to be transportable such as by being carried on the person or the like. Such data may be provided in any form such as an alphanumeric, graphical, or image-based form. Personal data may include personal information such as a person's name, address, height, weight, age, birthday, hair and eye color, and the like. Biometric data may be a finger print identification, face feature identification, eye feature identification, face image, electronic signature identification or other means to specifically identify an individual person. In any case, the data preferably comprises electronically storable data that is desired to be stored in a secure encrypted form.

After the data is identified, the encoding step 14 is preferably used to encode the data. Preferably an electronic or software coding process is used and such electronic coding of data can be done by any desired technique. For example, data to be encoded can be converted to a binary stream of ones and zeros. The binary information can then be further encrypted to allow Error Detection And Correction (EDAC). Reed-Solomon error correction, now used by almost all 2D bar codes, is a byte-correcting scheme that is widely used for digital storage applications in fields such as telecommunications, for example. By this technique, Reed-Solomon error correcting codewords are incorporated along with data codewords to form an integrated message. Area symbologies as well as techniques for electronically coding data are well known, such as are described in U.S. Pat. Nos. 5,612,524, 5,331,176, 4,972,475, and 4,924,078, the entire disclosures of which are incorporated herein by reference for all purposes.

Step 16 is then preferably used to generate a digital data matrix from the encoded data. For example, the encrypted binary stream (or data encoded in any other form) can be distributed to a 2-dimensional symbology such as a matrix array. Any linear, area, or stacked symbology can be used. A linear symbology as used herein, refers to a symbology that uses one or more rows of bars and spaces such as a bar code or the like. An area symbology as used herein, refers to any symbology, such as those commercially known under the trade names VeriCode™ or VSCode™ or Data Matrix™ or Code One™ or the like, that employs a matrix of data cells, rather than one or more rows of bars and spaces. A stacked symbology, as used herein, refers to any symbology, such as PDF 417, that generally employs plural adjacent rows of symbols, each row having several characters defined by groups of multiple-width bars and spaces. As an example, the encoded data can be used to create a matrix of VeriCode™ cells. This can be done by digitizing the encoded data into binary bit form and processed by a software algorithm to generate a code. Such techniques are known in the art such as described in the above-identified U.S. patents.

Preferably, the digital data matrix (such as the VeriCode™ matrix, for example) is then stored in a storage device such as a memory device. Preferably, the digital data matrix is provided in a form that can be stored in a typical memory storage device. In order to do so it may be desirable (but not required) to reduce the size or compress the digital data matrix. This can be done in several ways such as by bitpacking, compression by data cells, and compression by rows as described below however any technique capable of converting a digital data matrix to a form suitable for storage and retrieval in a memory storage device can be used.

As an example, by utilizing bitpacking, a grouping of eight (8) data cells of a digital data matrix can be written as a byte to a memory storage device. Therefore, considering a 48×48 matrix as an example, a 48×48 matrix can be stored in 288 bytes (48*48=2304, 2304/8=288). In accordance with the present invention, any desired data cell grouping value can be used to store a matrix having any dimensions.

As another example, compression by data cells can be used. This method uses a variation of Run Length Encoding (RLE) to reduce the number of bytes stored. This variant of RLE can encode a digital data matrix of data cells as follows. A scheme can be used where if the first two bits are 00, this indicates a run of 0 bits and if the first two bits are 01, this indicates a run of 1 bit where the maximum number of bits is 63. Also, if the first two bits are 10, this indicates a run of a mixture of 0 and 1 bits where the maximum number of bits is 6. Therefore, as an example, a 48×48 matrix can be stored in 37 bytes (best case, entire matrix is 0 or entire matrix is 1, 2304/63=36.57) to 384 bytes (worst case, no run of 0 or 1 bit greater than 6 bits). Any similar scheme can be used.

As another example, compression by row can be used. This method also uses a variation of Run Length Encoding to reduce the number of bytes stored. Each digital data matrix row is preferably compressed separately. This variant of RLE can encode the digital data matrix data cells as follows. If the first two bits are 00, this indicates a run of 0 bits and the maximum number of bits is 63. If the first two bits are 01, this indicates a run of 1 bit and the maximum number of bits is also 63. If the first two bits are 10, this indicates a run of a mixture of 0 and 1 bits and the maximum number of bits is 6. If the first two bits are 11, this indicates end of a row. Therefore, as an example, a 48×48 matrix can be stored in 96 bytes (best case, entire matrix is 0 or entire matrix is 1, 1 byte of data and 1 end marker for each of the 48 rows, 2*48=96) to 432 bytes (worst case, no run of 0 or 1 bits greater than 6 bits, 48/6=8 data and 1 end marker for each of the 48 rows, 9*48=432).

It is noted that chaining or attaching or stringing together plural data matrixes may also be used. That is, large amounts of data may be provided as plural data matrixes. These data matrixes may be linked together to form a defined data chain. This can allow larger quantities of data to be stored in secure form on electronic media, or transmitted as an attached binary file.

Any storage device can be used. Storage devices may be integrated or portable. Also, storage can take place locally or remotely. For example, storage can take place over a network such as a local network or the Internet or the like. Storage devices such as magnetic, optical, and electronic storage devices including magnetic tape, magnetic disks, optical discs, as well as electronic circuit cards such as memory cards including magnetic or optical cards, smart cards, or any other static or dynamic memory devices may be used.

Electronic circuit cards, including memory cards, are commonly used to store digital data in a non-volatile manner for use with various products (e.g., electronic products). Examples of memory cards are flash cards that use Flash type or EEPROM type memory cells to store the data. Memory cards have a relatively small form factor and have been used to store digital data for products such as cameras, hand-held computers, mobile telephones, set-top boxes, game consoles, hand-held or other small audio players/recorders (e.g., MP3 devices), and medical monitors.

Such cards may have only memory or may also include a microprocessor, the latter often being referred to as a Smart Card. A Smart Card preferably conforms to a Smart Card standard, such as the ISO 7816 standard. One application of a Smart Card is as a financial transaction card such as a debit card where an initial credit balance is decreased every time it is used to purchase a product or a service. Other applications include security access cards, toll collection cards, and the like. Such cards and applications thereof are described in Applicant's copending U.S. patent application entitled "High-Security Card and System," filed on Nov. 13, 2003 and having Ser. No. 10/713,247, the entire disclosure of which is incorporated herein by reference for all purposes.

Figure 2:
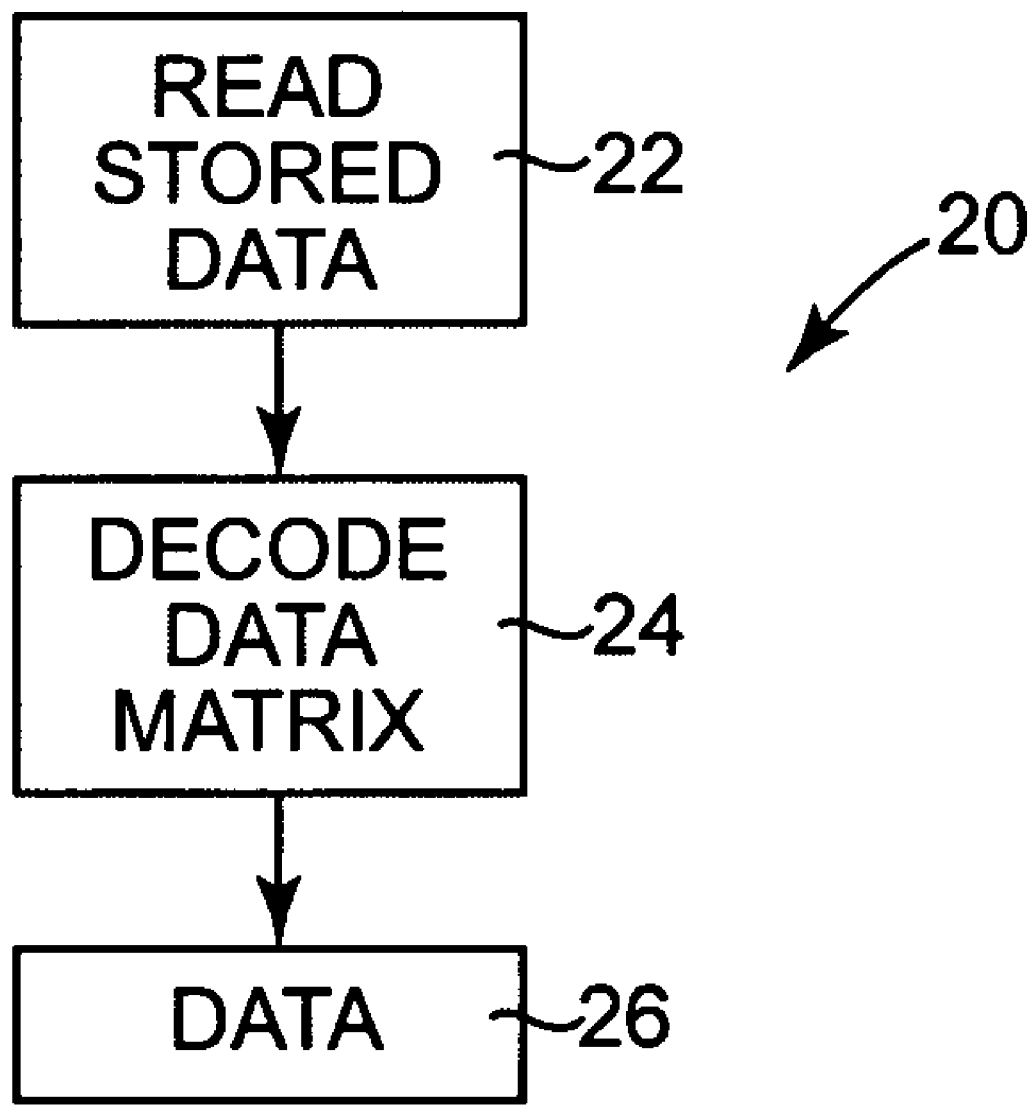
FIG. 2 is a flowchart of a process for decoding information in accordance with the present invention.

Referring to FIG. 2, an exemplary process 20 of the present invention for reading and decoding data is shown. Generally, the process 20 preferably includes steps of reading stored data 22, decoding the stored data 24, and providing the decoded data 26. However, additional steps are contemplated such as data processing steps for manipulating, converting, editing or otherwise acting on the data in any way. Smart Cards can be read by conventional readers in accordance with any particular Smart Card standard that is used.

When a digital data matrix is encoded and stored on a memory device in accordance with the present invention, the security features of the particular encoding techniques can be used without the need to print or otherwise provide a secure encoded symbol. The encoding/security advantages of such symbol-based techniques can be used without having to print the symbols and subsequently optically process the symbols in order to obtain the data in such symbols. The symbols from such two-dimensional symbologies can be processed electronically rather than graphically or optically. In this way, security features of any known or developed symbology having an encoding/decoding algorithm can be utilized without the need for a physical symbol.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method of encoding and electronically storing at least one of personal, biometric or financial information within an electronic storage device so as to facilitate the use of the stored information from the storage device as part of an activity that utilizes at least some of the stored information, the method comprising the steps of:
    providing at least one of personal, biometric or financial information to be encoded;
    encoding the information into digital data;
    generating a two-dimensional matrix of digital data cells from the encoded information; and
    electronically storing the two-dimensional matrix of encoded information by electronically writing the two-dimensional matrix of encoded information to an electronic memory storage device as a data file usable for printing a two-dimensional bar code symbol and allowing access to the two-dimensional matrix data file to permit decoding of the two-dimensional matrix data file and information decoding for use in an activity without utilizing either of optical scanning and image capturing of a printed bar code symbol.

2. The method of claim 1, wherein the information to be encoded comprises alphanumeric information.

3. The method of claim 1, wherein the information to be encoded comprises graphical information.

4. The method of claim 1, wherein the information to be encoded comprises biometric information.

5. The method of claim 1, wherein the step of encoding the information comprises encoding the information into Reed-Solomon blocks.

6. The method of claim 1, wherein the step of encoding the information comprises compressing the information.

7. The method of claim 1, wherein the step of encoding the information comprises using error correction and detection.

8. The method of claim 1, wherein the memory storage device comprises a portable memory storage device.

9. The method of claim 8, wherein the portable memory storage device comprises a smart card.

10. The method of claim 1, further comprising the step of compressing the generated two-dimensional matrix.

11. The method of claim 10, wherein the two-dimensional matrix comprises a plurality of data cells and compressing the two-dimensional matrix comprises bitpacking at least a portion of the data cells of the two-dimensional matrix.

12. The method of claim 10, wherein the two-dimensional matrix comprises a plurality of data cells and compressing the two-dimensional matrix comprises run length encoding of at least a portion of the data cells of the two-dimensional matrix.

13. The method of claim 10, wherein the two-dimensional matrix comprises a plurality of data cells arranged in at least one data row and compressing the two-dimensional matrix comprises run length encoding of at least a portion of the at least one row of the two-dimensional matrix.

14. The method of claim 1, further comprising electronically reading the two-dimensional matrix of encoded information from the memory storage device.

15. The method of claim 14, further comprising decoding the two-dimensional matrix of encoded information.

16. A method of encoding and electronically storing at least one of personal, biometric or financial information within an electronic storage device so as to facilitate the use of the stored information from the storage device as part of an activity that utilizes at least some of the stored information, the method comprising the steps of:
    providing at least one of personal, biometric or financial information to be encoded;
    encoding the information into digital data;
    generating a two-dimensional matrix of digital data cells from the encoded information; and
    electronically storing the two-dimensional matrix of encoded information in a smart card by electronically writing the two-dimensional matrix of encoded information to an electronic memory storage device of the smart card as a data file usable for printing a two-dimensional bar code symbol and allowing access to the two-dimensional matrix data file to permit decoding of the two-dimensional matrix data file and information decoding for use in an activity without utilizing either of optical scanning and image capturing of a printed bar code symbol.

17. The method of claim 16, comprising decoding the two-dimensional matrix of encoded information.

18. The smart card of claim 16, wherein the encoded information comprises biometric information.

* * * * *